United States Patent
Gotou et al.

(10) Patent No.: US 9,616,916 B2
(45) Date of Patent: Apr. 11, 2017

(54) ELECTRIC POWER STEERING DEVICE

(71) Applicant: KAYABA INDUSTRY CO., LTD., Minato-ku, Tokyo (JP)

(72) Inventors: Takashi Gotou, Aichi (JP); Daiki Hayashi, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/814,512

(22) Filed: Jul. 31, 2015

(65) Prior Publication Data
US 2016/0031476 A1 Feb. 4, 2016

(30) Foreign Application Priority Data
Aug. 1, 2014 (JP) .................. 2014-157744

(51) Int. Cl.
*B62D 5/04* (2006.01)
*B60R 16/02* (2006.01)

(52) U.S. Cl.
CPC ............ *B62D 5/04* (2013.01); *B60R 16/0215* (2013.01)

(58) Field of Classification Search
CPC ...... B62D 5/04; B62D 5/0403; B62D 5/0406; B62D 5/0418; B62D 5/0421; B62D 5/0424; B62D 5/0427
See application file for complete search history.

(56) References Cited

U.S. PATENT DOCUMENTS

| | | | | |
|---|---|---|---|---|
| 5,596,138 A | * | 1/1997 | Onodera | G01M 3/26 73/49.2 |
| 5,598,899 A | * | 2/1997 | Onodera | B60R 16/0207 180/433 |
| 9,096,260 B1 | * | 8/2015 | Yamamoto | B62D 1/195 |
| 2004/0002251 A1 | * | 1/2004 | Pavlovic | H01R 4/2416 439/395 |
| 2007/0063596 A1 | * | 3/2007 | Akutsu | H02K 11/21 310/68 B |
| 2011/0278995 A1 | * | 11/2011 | Akutsu | B62D 5/0403 310/68 D |
| 2014/0106665 A1 | * | 4/2014 | Ong | H01Q 1/007 455/14 |
| 2014/0300304 A1 | * | 10/2014 | Omae | H02K 11/024 318/400.24 |
| 2016/0083008 A1 | * | 3/2016 | Murakami | B62D 5/0421 180/443 |

FOREIGN PATENT DOCUMENTS

JP 2009-150429 A 7/2009

* cited by examiner

*Primary Examiner* — Kevin Hurley
(74) *Attorney, Agent, or Firm* — Hauptman Ham, LLP

(57) ABSTRACT

An electric power steering device includes a ferrite core mounted on a wire harness connected to an electric motor and a bracket configured to fix the ferrite core to a vehicle.

8 Claims, 3 Drawing Sheets

ELECTRIC POWER STEERING DEVICE

TECHNICAL FIELD

The present invention relates to an electric power steering device.

BACKGROUND ART

JP2009-150429A discloses an electric power steering device for assisting a steering force by transmitting a rotational force of an electric motor to a rack shaft.

SUMMARY OF INVENTION

In an electric power steering device, it is required to suppress noise generated from a wire harness connected to an electric motor to prevent a radio from being disturbed by noise.

Further, since slight sliding abrasion easily occurs on a terminal connecting the wire harness and the electric motor due to the vibration of the wire harness, it is required to suppress the vibration of the wire harness.

The present invention aims to suppress noise generated from a wire harness and suppress the vibration of the wire harness as a factor causing the occurrence of slight sliding abrasion.

According to one aspect of the present invention, an electric power steering device for assisting a steering force by transmitting a rotational force of an electric motor to a rack shaft includes a ferrite core mounted on a wire harness, the wire harness being connected to the electric motor, and a bracket configured to fix the ferrite core to a vehicle.

DESCRIPTION OF EMBODIMENT

Hereinafter, an electric power steering device 100 according to an embodiment of the present invention is described with reference to FIG. 1.

The electric power steering device 100 is a device mounted in a vehicle (not shown) and configured to assist a steering force when a driver operates a steering wheel 1.

Figure 1:
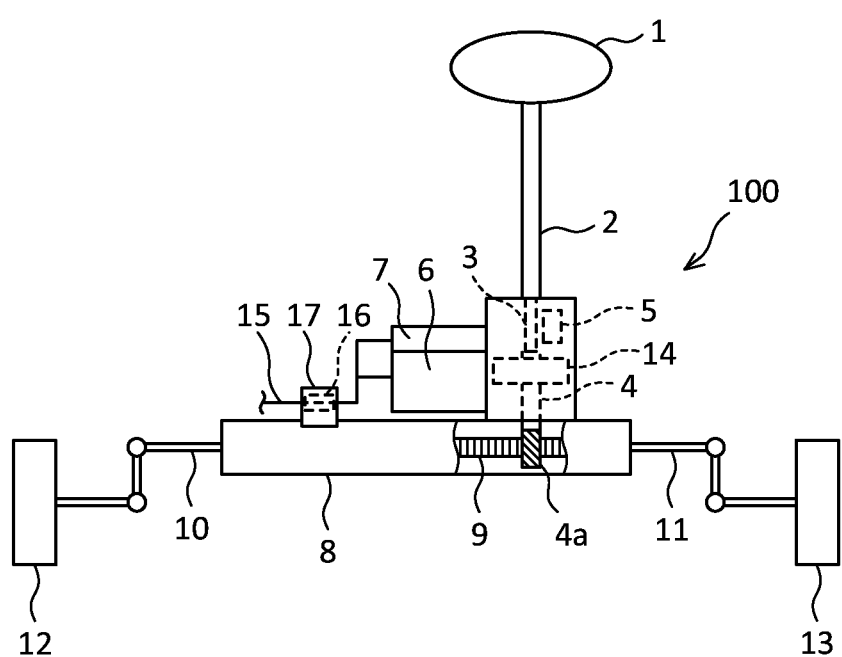
FIG. 1 is a schematic configuration diagram showing an electric power steering device according to an embodiment of the present invention.

As shown in FIG. 1, the electric power steering device 100 includes a steering input shaft 2 which is coupled to the steering wheel 1 and to which a steering force when the driver operates the steering wheel 1 is input, a steering output shaft 4 which is coaxially coupled to the steering input shaft 2 via a torsion bar 3, a torque sensor 5 which detects a torque acting on the torsion bar 3, an electric motor 6 which applies an assist force corresponding to an output of the torque sensor 5 to the steering output shaft 4, a motor controller 7 which controls the operation of the electric motor 6 and a rack shaft 9 which is housed in a rack housing 8.

One end of the torsion bar 3 is fixed to the steering input shaft 2 and the other end thereof is fixed to the steering output shaft 4. In this way, the steering output shaft 4 is coupled to the steering input shaft 2 via the torsion bar 3 and the steering input shaft 2 and the steering output shaft 4 relatively rotate as much as the torsion bar 3 is twisted.

The steering force when the driver operates the steering wheel 1 is transmitted to the steering output shaft 4 via the torsion bar 3 when being input to the steering input shaft 2. At this time, the torque sensor 5 detects a torque acting on the torsion bar 3 on the basis of a twist amount of the torsion bar 3 and outputs a torque signal to the motor controller 7.

A pinion gear 4a is formed on one end of the steering output shaft 4. The pinion gear 4a is meshed with the rack shaft 9 housed movably in an axial direction in the rack housing 8. This causes the rack shaft 9 to move in the axial direction and wheels 12, 13 coupled to the rack shaft 9 via tie rods 10, 11 to be steered when the steering output shaft 4 rotates.

A speed reduction gear 14 is fixed to the other end of the steering output shaft 4 and the steering output shaft 4 integrally rotates with the speed reduction gear 14.

The electric motor 6 is a motor which operates on the basis of a control signal output by the motor controller 7.

A wire harness 15 is connected to the electric motor 6 and the motor controller 7 and power is supplied to the electric motor 6 and the motor controller 7 from a power supply device (not shown) of the vehicle. Further, various signals are input to the motor controller 7 from an integrated controller (not shown) of the vehicle.

The motor controller 7 controls the operation of the electric motor 6 on the basis of various signals input from the integrated controller and a torque signal input from the torque sensor 5 and outputs various signals to the integrated controller. Although the electric power steering device 100 includes the motor controller 7 in the present embodiment, the motor controller 7 may not be provided and the operation of the electric motor 6 may be controlled, for example, by the integrated controller.

A rotational force of the electric motor 6 is reduced in speed and amplified in torque via the speed reduction gear 14 and transmitted from the steering output shaft 4 to the rack shaft 9. In this way, the steering force when the driver operates the steering wheel 1 is assisted.

In the electric power steering device 100, it is required to suppress noise generated from the wire harness 15 to prevent a radio from being disturbed by noise.

Further, since slight sliding abrasion easily occurs on a terminal connecting the electric motor 6 and the wire harness 15 and a terminal connecting the motor controller 7 and the wire harness 15 due to the vibration of the wire harness 15, it is required to suppress the vibration of the wire harness 15.

Accordingly, in the present embodiment, noise generated from the wire harness 15 is suppressed by mounting a ferrite core 16 on the wire harness 15 and the vibration of the wire harness 15 as a factor causing the occurrence of slight sliding abrasion is suppressed by fixing the ferrite core 16 to the rack housing 8 by a bracket 17.

This is described in detail below with reference to FIGS. 2 to 4.

Figure 2:
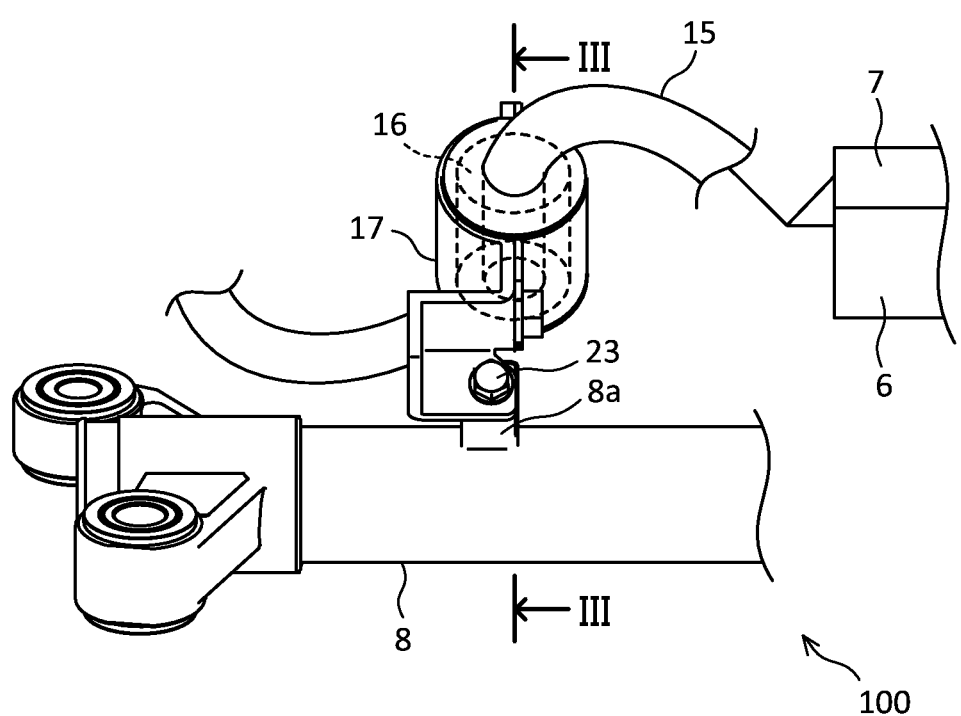
FIG. 2 is a view showing a state where a wire harness is arranged.

FIG. 2 is a view showing a state where the wire harness 15 is arranged. FIG. 3 is a view showing the ferrite core 16 and the bracket 17 in a cross-section along III-III of FIG. 2. FIG. 4 is a sectional view along IV-IV of FIG. 3.

As shown in FIG. 2, the wire harness 15 is connected to the electric motor 6 and the motor controller 7 and the ferrite core 16 is mounted on the outer periphery of the wire harness 15. The ferrite core 16 is fixed to the rack housing 8 together with the wire harness 15 via the bracket 17 fixed to the rack housing 8.

By fixing the ferrite core 16 mounted on the wire harness 15 to the rack housing 8 in this way, the vibration of a part of the wire harness 15 opposite to the electric motor 6 across the ferrite core 16 can be blocked by a part where the ferrite core 16 is mounted and the transmission of the vibration to a part of the wire harness 15 between the ferrite core 16 and the electric motor 6 can be prevented.

Further, since the rack housing 8 integrally vibrates with the electric motor 6 and the like, a part of the wire harness 15 closer to the electric motor 6 than the ferrite core 16 also integrally vibrates with the electric motor 6 and the like by fixing the ferrite core 16 to the rack housing 8. In this way, the vibration of the wire harness 15 accompanied by a relative displacement with respect to the electric motor 6 and the like, i.e. the vibration of the wire harness 15 as a factor causing the occurrence of slight sliding abrasion can be more suppressed than in the case of fixing the ferrite core 16 to a part of the vehicle other than the rack housing 8 such as a sub-frame (not shown).

Figure 3:
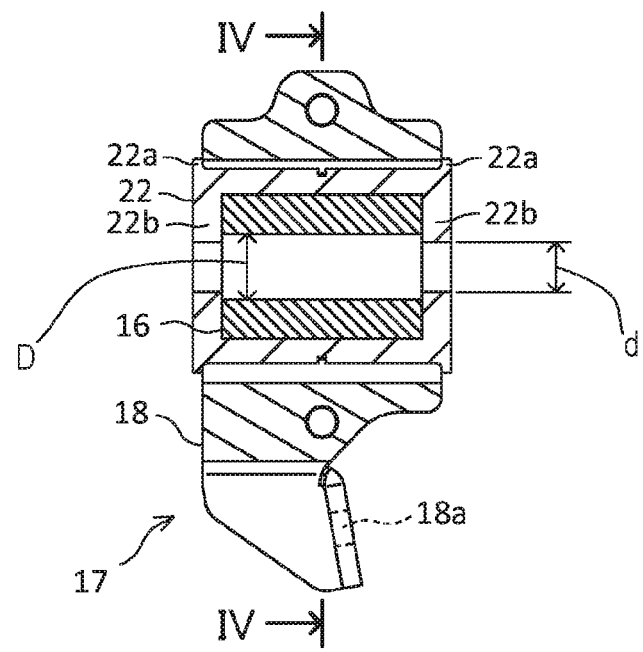
FIG. 3 is a view showing a ferrite core and a bracket in a cross-section along III-III of FIG. 2.
Figure 4:
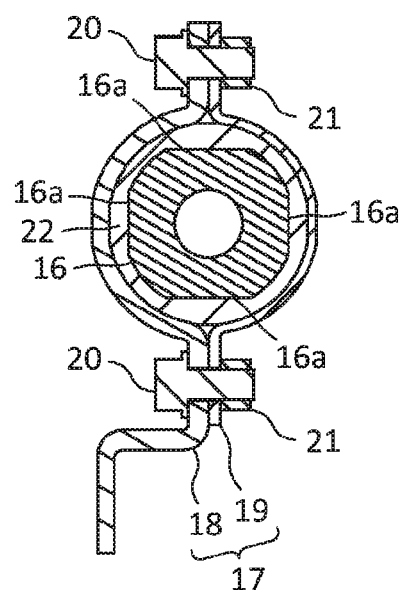
FIG. 4 is a sectional view along IV-IV of FIG. 3.

As shown in FIGS. 3 and 4, the ferrite core 16 is a hollow cylindrical member and a cylindrically shaped portion on the inner periphery is in contact with the wire harness 15. Specifically, the outer periphery of the wire harness 15 is in contact with the ferrite core 16 in a specific longitudinal range. Since this causes the wire harness 15 to be held in a non-swingable manner by the ferrite core 16, the flexural rigidity of the part of the wire harness 15 between the ferrite core 16 and the electric motor 6 increases. Thus, the vibration of the wire harness 15 can be suppressed.

As shown in FIG. 4, the bracket 17 is configured to include a first plate 18 and a second plate 19 and can hold the ferrite core 16 between the first and second plates 18, 19 by fastening the first and second plates 18, 19 by bolts 20 and nuts 21. In the present embodiment, a hollow cylindrical vibration-proof rubber 22 is provided between the ferrite core 16 and the bracket 17, making it difficult to transmit the vibration of the vehicle to the ferrite core 16 and the wire harness 15.

As shown in FIG. 3, the first plate 18 is provided with a mounting hole 18a for fixing the bracket 17 to the rack housing 8. This causes the bracket 17 to be fixed to a mounting portion 8a provided on the rack housing 8 by a bolt 23 as shown in FIG. 2.

As just described, in the electric power steering device 100, the vibration of the wire harness 15 as a factor causing the occurrence of slight sliding abrasion is suppressed while increases in the number of components and cost are suppressed utilizing the ferrite core 16 for suppressing the noise of the wire harness 15.

Further, as shown in FIG. 3, the vibration-proof rubber 22 includes outer peripheral side jaw portions 22a respectively formed on outer peripheral sides of opposite end parts and inner peripheral side jaw portions 22b respectively formed on inner peripheral sides of the opposite end parts.

Two outer peripheral side jaw portions 22a sandwich the bracket 17 therebetween and function as a retainer for preventing the detachment of the vibration-proof rubber 22 from the bracket 17. Similarly, two inner peripheral side jaw portions 22b sandwich the ferrite core 16 therebetween and function as a retainer for preventing the detachment of the ferrite core 16 from the vibration-proof rubber 22.

Further, inner diameters (d in FIG. 3) of the inner peripheral side jaw portions 22b are smaller than an inner diameter (D in FIG. 3) of the ferrite core 16. Thus, the wire harness 15 can be held by the vibration-proof rubber 22 and the application of an excessive force to the wire harness 15 can be prevented.

Further, as shown in FIG. 4, the ferrite core 16 includes a flat portion 16a formed on the outer peripheral surface.

The flat portion 16a functions as a rotation stopper for preventing the ferrite core 16 from rotating about an axis with respect to the vibration-proof rubber 22. It should be noted that the outer peripheral surface of the ferrite core 16 has only to be non-circular. Thus, a portion having another shape other than the flat portion 16a may be formed on the outer peripheral surface of the ferrite core 16.

As described above, since the ferrite core 16 is mounted on the wire harness 15 according to the present embodiment, noise generated from the wire harness 15 can be suppressed.

Further, since the ferrite core 16 mounted on the wire harness 15 is fixed to the rack housing 8, the vibration of the part of the wire harness 15 opposite to the electric motor 6 across the ferrite core 16 can be blocked by the part where the ferrite core 16 is mounted. Thus, it is possible to prevent the transmission of the vibration to the part of the wire harness 15 between the ferrite core 16 and the electric motor 6 and suppress the vibration of the wire harness 15.

Further, since the inner periphery of the ferrite core 16 has a cylindrical shape, the outer periphery of the wire harness 15 is in contact with the ferrite core 16 in the specific longitudinal range. Since this causes the wire harness 15 to be held in a non-swingable manner by the ferrite core 16, the flexural rigidity of the part of the wire harness 15 between the ferrite core 16 and the electric motor 6 increases. Thus, the vibration of the wire harness 15 can be suppressed.

Further, since the rack housing 8 integrally vibrates with the electric motor 6 and the like, the part of the wire harness 15 closer to the electric motor 6 than the ferrite core 16 also integrally vibrates with the electric motor 6 and the like by fixing the ferrite core 16 to the rack housing 8. In this way, the vibration of the wire harness 15 accompanied by a relative displacement with respect to the electric motor 6 and the like, i.e. the vibration of the wire harness 15 as a factor causing the occurrence of slight sliding abrasion can be more suppressed than in the case of fixing the ferrite core 16 to a part of the vehicle other than the rack housing 8.

Further, since the vibration-proof rubber 22 is provided between the ferrite core 16 and the bracket 17, the vibration of the vehicle is less likely to be transmitted to the ferrite core 16 and the wire harness 15. Thus, the vibration of the wire harness 15 can be suppressed.

Further, since the vibration-proof rubber 22 includes the two outer peripheral side jaw portions 22a respectively formed on the outer peripheral sides of the opposite end parts and sandwiching the bracket 17 and the two inner peripheral side jaw portions 22b respectively formed on the inner peripheral sides of the opposite end parts and sandwiching the ferrite core 16, the detachment of the vibration-proof rubber 22 from the bracket 17 can be prevented and the detachment of the ferrite core 16 from the vibration-proof rubber 22 can be prevented.

Further, since the inner diameters of the inner peripheral side jaw portions 22b of the vibration-proof rubber 22 are smaller than that of the ferrite core 16, the wire harness 15 can be held by the vibration-proof rubber 22 and the application of an excessive force to the wire harness 15 can be prevented.

Embodiments of this invention were described above, but the above embodiments are merely examples of applications of this invention, and the technical scope of this invention is not limited to the specific constitutions of the above embodiments.

For example, although the present invention is applied to the electric power steering device 100 of a so-called single-pinion type in the above embodiment, the present invention can also be applied, for example, to an electric power steering device of a dual-pinion type or the like.

Further, a wiring path of the wire harness 15 and a position where the ferrite core 16 is fixed to the vehicle by the bracket 17 can be appropriately changed according to the layout of the vehicle.

Further, although the ferrite core 16 is a hollow cylindrical member in the above embodiment, it may be formed, for example, by combining two hollow semi-cylindrical ferrites.

With respect to the above description, the contents of application No. 2014-157744, with a filing date of Aug. 1, 2014 in Japan, are incorporated herein by reference.

The invention claimed is:

1. An electric power steering device for assisting a steering force by transmitting a rotational force of an electric motor to a rack shaft, the electric power steering device comprising:
    a ferrite core mounted on a wire harness, the wire harness being connected to the electric motor; and
    a bracket configured to fix the ferrite core to a vehicle, the bracket being disposed apart from an end portion of the wire harness on an electric motor side.

2. The electric power steering device according to claim 1, wherein:
    a portion of the ferrite core which contacts the wire harness has a hollow cylindrical shape.

3. The electric power steering device according to claim 1, wherein:
    the bracket is fixed to a rack housing for housing the rack shaft.

4. The electric power steering device according to claim 1, wherein:
    the wire harness has an end connected to the electric motor, and
    the bracket is distanced from said end of the wire harness.

5. An electric power steering device for assisting a steering force by transmitting a rotational force of an electric motor to a rack shaft, the electric power steering device comprising:
    a ferrite core mounted on a wire harness, the wire harness being connected to the electric motor;
    a bracket configured to fix the ferrite core to a vehicle; and
    a vibration-proof rubber provided between the ferrite core and the bracket in a radial direction of the wire harness,
    wherein the bracket grips the wire harness in the radial direction of the wire harness.

6. The electric power steering device according to claim 5, wherein:
    the wire harness has an end connected to the electric motor, and
    the bracket is distanced from said end of the wire harness.

7. An electric power steering device for assisting a steering force by transmitting a rotational force of an electric motor to a rack shaft, the electric power steering device comprising:
    a ferrite core mounted on a wire harness, the wire harness being connected to the electric motor;
    a bracket configured to fix the ferrite core to a vehicle; and
    a vibration-proof rubber provided between the ferrite core and the bracket, wherein:
    the vibration-proof rubber has a hollow cylindrical shape and includes:
        two outer peripheral side jaw portions respectively formed on outer peripheral sides of opposite end parts of the vibration-proof rubber, the two outer peripheral side jaw portions sandwiching the bracket; and
        two inner peripheral side jaw portions respectively formed on inner peripheral sides of the opposite end parts of the vibration-proof rubber, the two inner peripheral side jaw portions sandwiching the ferrite core.

8. The electric power steering device according to claim 5, wherein:
    the vibration-proof rubber has a hollow cylindrical shape and includes:
        two outer peripheral side jaw portions respectively formed on outer peripheral sides of opposite end parts of the vibration-proof rubber, the two outer peripheral side jaw portions sandwiching the bracket; and
        two inner peripheral side jaw portions respectively formed on inner peripheral sides of the opposite end parts of the vibration-proof rubber, the two inner peripheral side jaw portions sandwiching the ferrite core, and
    inner diameters of the inner peripheral side jaw portions are smaller than an inner diameter of the ferrite core.

* * * * *